(12) United States Patent
Prakash et al.

(10) Patent No.: US 10,222,504 B2
(45) Date of Patent: Mar. 5, 2019

(54) ANTENNAS FOR WELLBORE LOGGING TOOLS HAVING A PLURALITY OF FERRITE CHANNELS ORTHOGONAL TO THE PLURALITY OF WINDING GROOVES

(71) Applicant: Halliburton Energy Services, Inc., Houston, TX (US)

(72) Inventors: Anand Prakash, Tomball, TX (US); Alexei Korovin, Houston, TX (US); James H. Cobb, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/893,399

(22) Filed: Feb. 9, 2018

(65) Prior Publication Data
US 2018/0172873 A1 Jun. 21, 2018

Related U.S. Application Data

(63) Continuation of application No. 15/039,170, filed as application No. PCT/US2015/038046 on Jun. 26, 2015, now Pat. No. 9,921,333.

(51) Int. Cl.
*G01V 3/28* (2006.01)
*E21B 49/00* (2006.01)
(Continued)

(52) U.S. Cl.
CPC ............. *G01V 3/28* (2013.01); *E21B 49/003* (2013.01); *G01V 13/00* (2013.01); *E21B 47/12* (2013.01)

(58) Field of Classification Search
CPC ..... G01R 31/2884; H01F 1/01; H02K 11/215; H02K 29/08; H02K 7/003; H02K 7/08;
(Continued)

(56) References Cited

U.S. PATENT DOCUMENTS 6,191,586 B1 2/2001 Bittar
6,727,707 B2 4/2004 Sinclair et al.
(Continued)

FOREIGN PATENT DOCUMENTS

EA 200400234 8/2004
RU 2506611 2/2014

OTHER PUBLICATIONS

International Search Report and Written Opinion from PCT/US2015/038022, dated Feb. 25, 2016.
(Continued)

*Primary Examiner* — Jay Patidar
(74) *Attorney, Agent, or Firm* — Alan Bryson; C. Tumey Law Group PLLC (57) ABSTRACT

An antenna assembly for wellbore logging tools is provided. The antenna assembly includes a coil wrapped about an outer surface of a bobbin positioned within a saddle of a tool mandrel. The antenna assembly also includes an inner sleeve positioned on an outer surface of the tool mandrel within the saddle, the inner sleeve being interposed between the coil and the tool mandrel. The antenna assembly also includes a plurality of ferrite channels formed within a groove defined in an inner surface of the inner sleeve, in which the plurality of ferrite channels being laterally separated by a plurality of dividers formed in the groove. The antenna assembly also includes a plurality of ferrites disposed within respective ones of the plurality of ferrite channels.

14 Claims, 4 Drawing Sheets

(51) Int. Cl.
 *G01V 13/00* (2006.01)
 *E21B 47/12* (2012.01)
(58) Field of Classification Search
 CPC ........ G01V 3/28; G01V 13/00; E21B 49/003; E21B 47/12
 See application file for complete search history.

(56) References Cited

U.S. PATENT DOCUMENTS

| | | | |
|---|---|---|---|
| 7,012,432 B2 | 3/2006 | Allan | |
| 7,413,018 B2 | 8/2008 | Hosie et al. | |
| 7,663,372 B2 | 2/2010 | Signorelli et al. | |
| 8,212,567 B2 | 7/2012 | Signorelli et al. | |
| 8,330,463 B2 | 12/2012 | Blanz | |
| 8,471,562 B2 | 6/2013 | Knizhnik | |
| 8,471,563 B2 | 6/2013 | Wisler et al. | |
| 8,738,908 B2 | 5/2014 | Lee | |
| 8,803,521 B2 | 8/2014 | Kruspe | |
| 2004/0183538 A1 | 9/2004 | Hanstein et al. | |
| 2004/0263414 A1 | 12/2004 | Chen et al. | |
| 2008/0068023 A1* | 3/2008 | Peter | G01V 3/30 324/338 |
| 2008/0224707 A1* | 9/2008 | Wisler | G01V 3/28 324/338 |
| 2009/0085701 A1 | 4/2009 | Veneruso et al. | |
| 2009/0179648 A1 | 7/2009 | Fredette et al. | |
| 2010/0244841 A1* | 9/2010 | Wang | E21B 47/102 324/333 |
| 2011/0316542 A1 | 12/2011 | Frey et al. | |
| 2013/0249561 A1 | 9/2013 | Knizhnik | |
| 2015/0268372 A1* | 9/2015 | Davydychev | G01V 3/28 324/339 |
| 2017/0160423 A1 | 6/2017 | Prakash et al. | |
| 2017/0184753 A1 | 6/2017 | Prakash et al. | |

OTHER PUBLICATIONS

International Search Report and Written Opinion from PCT/US2015/038046, dated Feb. 24, 2017.
RU Search Report for Application No. 2017140981 dated Sep. 21, 2018.

* cited by examiner

FIG. 5B

ANTENNAS FOR WELLBORE LOGGING TOOLS HAVING A PLURALITY OF FERRITE CHANNELS ORTHOGONAL TO THE PLURALITY OF WINDING GROOVES

CROSS-REFERENCE TO RELATED APPLICATIONS

The present application claims the benefit of priority under 35 U.S.C. § 120 as a continuation of U.S. application Ser. No. 15/039,170, entitled "AN ANTENNA ASSEMBLY USING FERRITES WITHIN AN INTERPOSED SLEEVE FOR WELLBORE LOGGING TOOLS," filed on May 25, 2016, which is the national stage of entry of International Patent Application No. PCT/US2015/038046, filed on Jun. 26, 2015, all of which are hereby incorporated by reference in their entirety for all purposes.

BACKGROUND

During drilling operations for the extraction of hydrocarbons, a variety of recording and transmission techniques are used to provide or record real-time data from the vicinity of a drill bit. Measurements of the surrounding subterranean formations may be made throughout drilling operations using downhole measurement and logging tools, such as measurement-while-drilling (MWD) and/or logging-while-drilling (LWD) tools, which help characterize the formations and aid in making operational decisions. Wellbore logging tools make measurements that may be used to determine the electrical resistivity (or its inverse, conductivity) of the formations being penetrated, where the electrical resistivity indicates various features of the formations. Those measurements may be taken using one or more antennas coupled to or otherwise associated with the wellbore logging tools.

Logging tool antennas are often formed by positioning coil windings about an axial section of the logging tool, such as a drill collar. A ferrite material or "ferrites" are sometimes positioned beneath the coil windings to increase the efficiency and/or sensitivity of the antenna. The ferrites facilitate a higher magnetic permeability path (i.e., a flux conduit) for the magnetic field generated by the coil windings, and help shield the coil windings from the drill collar and associated losses (e.g., eddy currents generated on the drill collar).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to antennas used in wellbore logging tools and methods of manufacturing the antennas.

The embodiments described herein reduce the complexity in assembling antennas used in wellbore logging tools while also providing mechanical integrity to the antenna. In manufacturing or building one of the antennas described herein, a plurality of ferrites may be positioned about an outer surface of a tool mandrel and extend circumferentially about the outer surface. In some cases, a groove is defined in the outer surface of the tool mandrel and the plurality of ferrites are secured within the groove by being molded into the groove or alternatively printed into the groove using an additive manufacturing process. In other cases, the plurality of ferrites may be seated within a plurality of channels defined on the inner surface of an inner sleeve that interposes a bobbin and the tool mandrel. The bobbin may then be positioned about the outer surface of the mandrel such that the plurality of ferrites interposes the tool mandrel and a portion of the bobbin. In some cases, the bobbin may be molded directly onto the outer surface of the inner sleeve. In other cases, however, the bobbin may be printed directly onto the outer surface via an additive manufacturing process. A coil winding may then be wrapped about the outer surface of the bobbin and extend axially along at least a portion of the outer surface.

Figure 1:
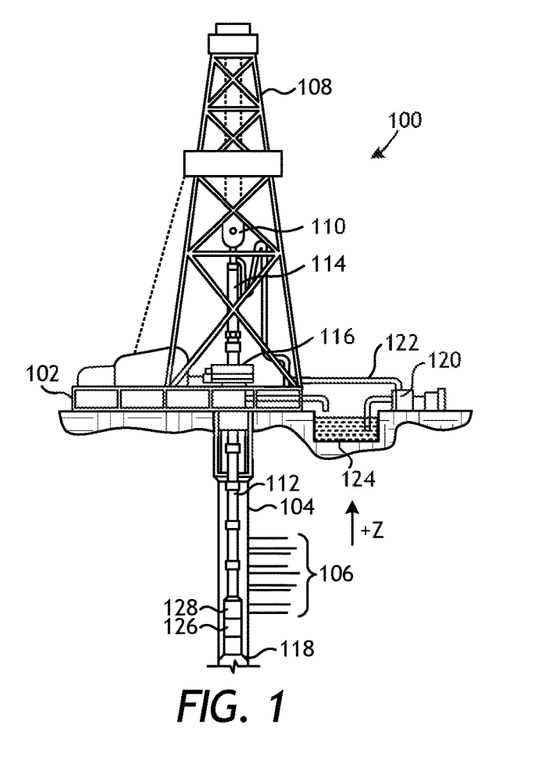
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one wellbore logging tool 126, which may comprise one or more antennas capable of receiving and/or transmitting one or more electromagnetic (EM) signals that are axially spaced along the length of the wellbore logging tool 126. As will be described in detail below, the wellbore logging tool 126 may further comprise a plurality of ferrites used to shield the EM signals and thereby increase the azimuthal sensitivity of the wellbore logging tool 126.

As the drill bit 118 extends the wellbore 104 through the formations 106, the wellbore logging tool 126 may continuously or intermittently collect azimuthally-sensitive measurements relating to the resistivity of the formations 106, i.e., how strongly the formations 106 opposes a flow of electric current. The wellbore logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the wellbore logging tool 126 may also be stored within the wellbore logging tool 126 or the telemetry module 128 for later retrieval at the surface upon retracting the drill string 112.

Figure 2:
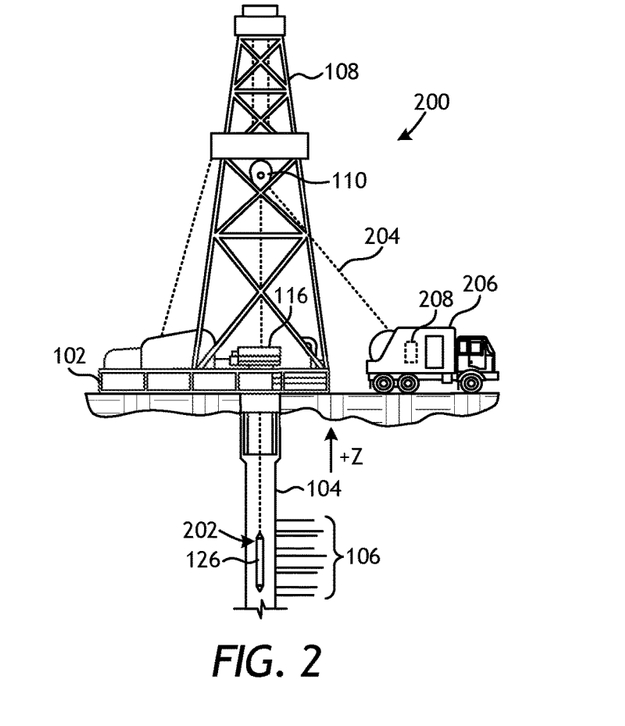
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended into the wellbore 104 by a cable 204. The wireline instrument sonde 202 may include the wellbore logging tool 126 described above, which may be communicably coupled to the cable 204. The cable 204 may include conductors for transporting power to the wireline instrument sonde 202 and also facilitate communication between the surface and the wireline instrument sonde 202. A logging facility 206, shown in FIG. 2 as a truck, may collect measurements from the wellbore logging tool 126, and may include computing and data acquisition systems 208 for controlling, processing, storing, and/or visualizing the measurements gathered by the wellbore logging tool 126. The computing facilities 208 may be communicably coupled to the wellbore logging tool 126 by way of the cable 204.

Figure 3A:
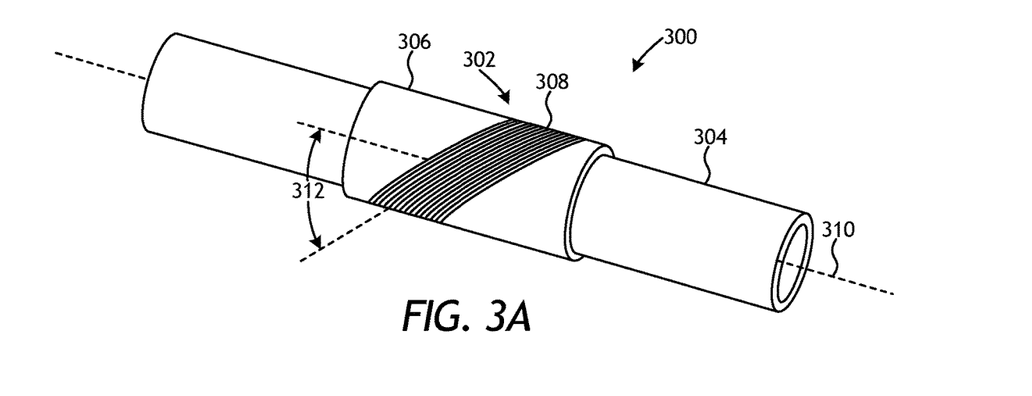
FIG. 3A is a partial isometric view of an exemplary wellbore logging tool.

FIG. 3A is a partial isometric view of an exemplary wellbore logging tool 300, according to one or more embodiments. The logging tool 300 may be the same as or similar to the wellbore logging tool 126 of FIGS. 1 and 2 and, therefore, may be used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 may include a bobbin 306 and a coil 308 wrapped about the bobbin 306 and extending axially by virtue of winding along at least a portion of an outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of the coil 308) about the bobbin 306, but typically will include at least a plurality (i.e. two or more) consecutive full turns, with each full turn extending 360 degrees about the bobbin 306. In some embodiments, a pathway for receiving the coil 308 may be formed along the outer surface of the bobbin 306. For example, one or more grooves may be defined in the outer surface of the bobbin 306 to receive and seat the coil 308. In other embodiments, however, the outer surface of the bobbin 306 may be smooth or even. The coil 308 can be concentric or eccentric relative to a central axis 310 of the tool mandrel 304.

As illustrated, the turns or windings of the coil 308 extend about the bobbin 306 at an angle 312 offset from the central axis 310. As a result, the antenna assembly 302 may be characterized and otherwise referred to as a "tilted coil" or "directional" antenna. In the illustrated embodiment, the angle 312 is 45°, by way of example, and could alternatively be any angle offset from the central axis 310, without departing from the scope of the disclosure.

Figure 3B:
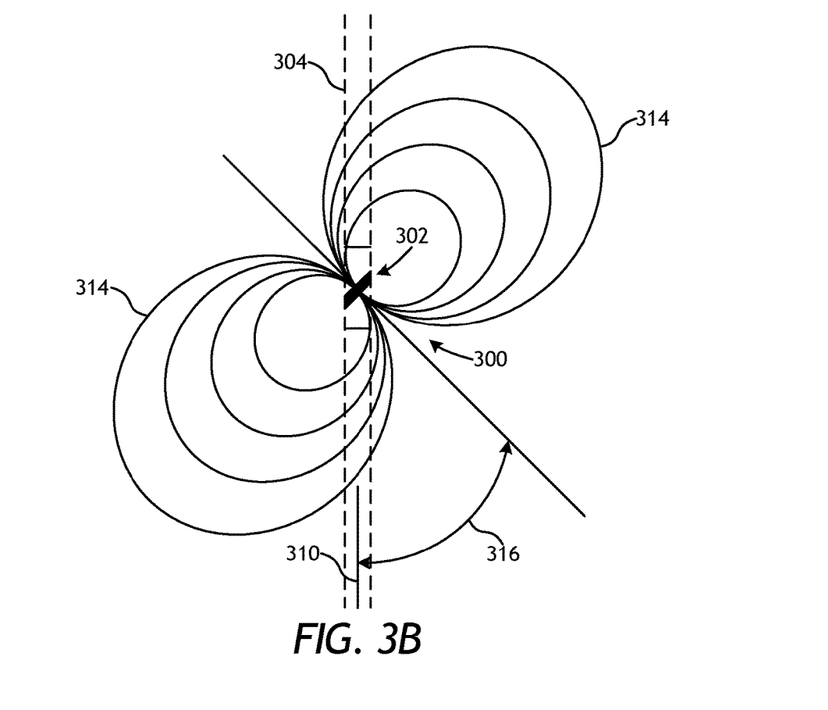
FIG. 3B is a schematic side view of the wellbore logging tool of FIG. 3A

FIG. 3B is a schematic side view of the wellbore logging tool 300 of FIG. 3A. When current is passed through the coil 308 of the antenna assembly 302, a dipole magnetic field 314 may be generated that extends radially outward from the antenna assembly 302 orthogonal to the winding direction. As a result, the antenna assembly 302 may exhibit a magnetic field angle 316 with respect to the tool mandrel 304 and, since the angle 312 (FIG. 3A) is 45°, the resulting magnetic field angle 316 will also be 45° offset from the central axis 310. As will be appreciated, however, the magnetic field angle 316 may be varied by adjusting or manipulating the angle 312.

Figure 4:
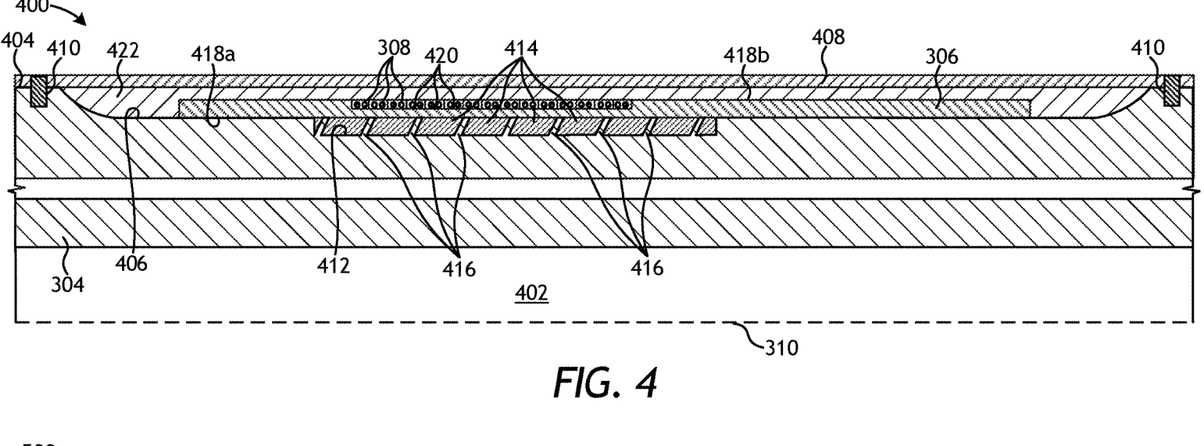
FIG. 4 is a cross-sectional side view of an exemplary antenna.

FIG. 4 is a cross-sectional side view of an exemplary antenna assembly 400, according to one or more embodiments. The antenna assembly 400 may be the same as or similar to the antenna assembly 302 of FIGS. 3A and 3B and therefore may be best understood with reference thereto, where like numerals represent like elements or components that may not be described again in detail. In the illustrated embodiment, the tool mandrel 304 may comprise a generally cylindrical structure that provides an interior 402 and an outer surface 404. In some embodiments, the tool mandrel 304 may further provide and otherwise define a saddle 406 that extends along a portion of the outer surface 404 of the tool mandrel 304. The saddle 406 may comprise a portion of the outer surface 404 that exhibits a reduced—diameter as compared to the remaining portions of the outer surface 404. In the illustrated embodiment, some or all of the components of the antenna assembly 400 may be positioned within the saddle 406 adjacent the outer surface 404.

The antenna assembly 400 may further provide an outer sleeve 408 that encapsulates and otherwise houses the various components of the antenna assembly 400 within the saddle 406. More particularly, the outer sleeve 408 may exhibit an inner diameter that is greater than an outer diameter of the tool mandrel 304 and a length sufficient to extend axially across the saddle 406. Moreover, the outer sleeve 408 provides a circumferential encapsulation by extending about the central axis 310 of the tool mandrel 304. The upper and lower ends of the outer sleeve 408 may be coupled to the outer surface 404 of the tool mandrel 304 at either end of the saddle 406 via one or more mechanical fasteners 410 such as, but not limited to, snap rings, latches, bolts, screws, or other known mechanical fasteners.

The outer sleeve 408 can be formed of a nonconductive or nonmetallic material such as, but not limited to, fiberglass, a polymer or polymeric material (e.g., polyether ether ketone or PEEK), a nickel-based alloy, a chromium-based alloy, a copper-based alloy, INCONEL®, MONEL®, an advanced composite, and/or any combination thereof. As will be appreciated, different materials or combinations of materials can be provided in multiple layers to form the outer sleeve 408, without departing from the scope of the disclosure.

The antenna assembly 400 may further provide at least one groove 412 defined in the outer surface 404 of the tool mandrel 304. The at least one groove 412 may be configured to receive and seat a plurality of ferrites 414. In some embodiments, as illustrated, one or more dividers 416 may be provided within the groove 412 and may otherwise extend radially outward from the groove 412. The dividers 416 may serve to prevent physical contact between laterally adjacent ferrites 414 that may be seated within the groove 412, and thereby prevent a continuous magnetic path between the laterally adjacent ferrites 414. The dividers 416 may be made of a variety of materials including, but not limited to, a high temperature plastic, a thermoplastic, a polymer (i.e., polyimide), a ceramic, an epoxy material, or any combination thereof. In at least one embodiment, the dividers 416 may be machined into the outer surface 404 of the tool mandrel 304 when the groove 412 is defined. In such embodiments, the groove 412 may comprise a plurality of grooves that are separated by the dividers 416.

In general, the dividers 416 may exhibit a relative permeability ($\mu_r$) of approximately 1, which is equivalent to the permeability of free space or air ($\mu_o$). Accordingly, the dividers 416 may be considered substantially equivalent to providing air gaps between the adjacent ferrites 414, often called "air-gapping," which essentially serves as a nonmagnetic insulator between the adjacent ferrites 414.

The bobbin 306 may be positioned within the saddle 406 radially outward from the ferrites 414 such that the ferrites 414 radially interpose the bobbin 306 and the tool mandrel 304. The bobbin 306 may provide and otherwise define an inner bobbin surface 418a and an outer bobbin surface 418b opposite the inner bobbin surface 418a. The inner bobbin surface 418a may be smooth and otherwise even, but may alternatively provide a variable inner surface, such as by defining one or more channels, grooves, etc. The coil 308 may be wrapped about the outer bobbin surface 418b and extend (i.e., wind) axially along at least a portion thereof. In some embodiments, similar to the inner bobbin surface 418a, the outer bobbin surface 418b may be smooth or even. In other embodiments, however, the outer bobbin surface 418b may define a plurality of winding grooves 420 configured to receive and seat the several turns of the coil 308.

In some embodiments, a protective layer 422 may be formed about the bobbin 306 within the saddle 406. The protective layer 422 may be configured to secure the bobbin 306 within the saddle 406 while simultaneously permitting propagation of signals from the antenna assembly 302 (FIGS. 3A-3B). The material of the protective layer 422 can be any material that is capable of withstanding downhole conditions, such as elevated temperatures and pressures, and also capable of withstanding exposure to common wellbore fluids, such as drilling fluids, contaminants, oil, gas, etc. The protective layer 422 can be formed of a nonconductive and/or nonmetallic material, such as a rubber material, a polymer, or and/or a polymeric material. In at least one embodiment, the protective layer 422 is made of a fluoropolymer elastomer, such as VITON®.

The ferrites 414 may be made of any ferritic or ferromagnetic material that has a relative magnetic permeability greater than 100, such as iron or an iron-based alloy. In some embodiments, the ferrites 414 may be formed of any soft magnetic material, such as manganese zinc (MnZn). The ferrites 414 may be positioned to radially interpose the coil 308 and the underlying tool mandrel 304 and thereby shield the coil 308 from eddy currents that may be generated by the tool mandrel 304 during downhole operation. As will be appreciated, this may increase the azimuthal sensitivity and/or increase the efficiency/field strength of the antenna assembly 400.

The ferrites 414 may be manufactured via a variety of processes. In some embodiments, for instance, the ferrites 414 may be machined out of a solid block of material. In such embodiments, for example, the block of material may comprise an iron powder or a ferrite powder that is pressed to form the block of material, and the ferrites 414 are machined out of the block of material to desired dimensions and/or geometry. In at least one embodiment, the block of material used to provide the ferrites 414 may comprise FLUXTROL® 100, available from Fluxtrol, Inc. of Auburn Hills, Mich., USA.

In other embodiments, the ferrites 414 may be molded from a mixture of a powder iron/ferrite material and a binder. The binder may include a silicone-based rubber, an elastomer, an RTV, a polymer (e.g., a polyimide), a ceramic, or an epoxy. The mixture is then pressed into a mold that corresponds to the specific dimensions and intricate geometry of the given ferrite 414 being manufactured. Upon cooling, the ferrite 414 may then be removed for placement in the antenna assembly 400.

In yet other embodiments, the ferrites 414 may be printed via an additive manufacturing (e.g., 3D printing) process. Suitable additive manufacturing processes that may be used to print the ferrites 414 include, but are not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LIVID)], any combination thereof, and the like. In at least one embodiment, the additive manufacturing technique may employ fusion deposition modeling (FDM) technology.

Once manufactured to desired dimensions and geometry, the ferrites 414 may be positioned within the groove 412 and otherwise secured to the tool mandrel 304. In some embodiments, for example, the ferrites 414 may be secured within the groove 412 using an industrial adhesive or glue, such as an epoxy or RTV silicone. In other embodiments, the ferrites 414 may be secured within the groove 412 using one or more mechanical fasteners, such as screws, bolts, pins, snap rings, etc., without departing from the scope of the disclosure.

In some embodiments, the ferrites 414 may be positioned in the groove 412 and otherwise secured to the tool mandrel 304 during manufacture of the ferrites 414. More particularly, in at least one embodiment, the ferrites 414 may be molded directly into the groove 412 during manufacture.

In other embodiments, the ferrites 414 may be printed directly into the groove 412 via additive manufacturing. In such embodiments, the ferrites 414 may be printed by rotating the tool mandrel 304 about the central axis 310 while progressively building the ferrites 414 with a 3D printing machine (not shown) to desired dimensions. Alternatively, the 3D printing machine may be configured to move (i.e., rotate) about the central axis 310 of the tool mandrel 304 to progressively build up the ferrites 414 to desired dimensions within the groove 412. In yet other embodiments, a combination of rotating the tool mandrel 304 and moving the 3D printing machine about the central axis 310 may be employed to progressively build up the ferrites 414 to desired dimensions.

As will be appreciated securing the ferrites 414 directly to the tool mandrel 304 (e.g., within the groove 412), whether by manufacturing the ferrites 414 individually and subsequently securing them to the tool mandrel 304, or during the manufacture process itself, may help enhance the mechanical strength of the antenna assembly 400. This may further help ease the assembly process of the antenna assembly 400. Moreover, this may also simplify and reduce the complexity of the antenna buildup by eliminating common antenna components, which can drive costs down but still maintain high reliability under downhole conditions.

Figure 5A:
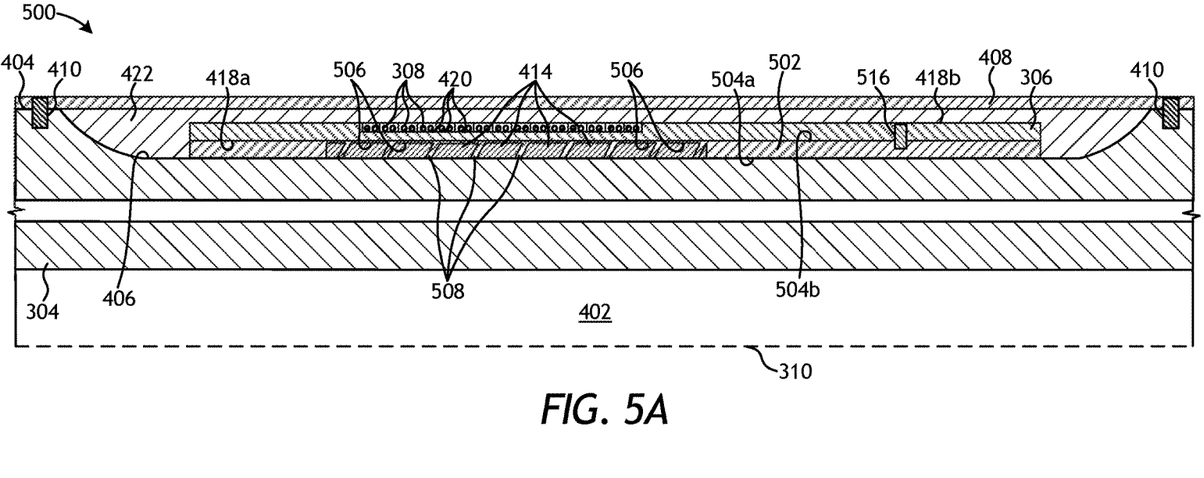
FIG. 5A is a cross-sectional side views of another exemplary antenna.

FIG. 5A is a cross-sectional side view of another exemplary antenna assembly 500, according to one or more embodiments. The antenna assembly 500 may be similar in some respects to the antenna assembly 400 of FIG. 4 and therefore may be best understood with reference thereto, where like numerals represent like elements or components that may not be described again in detail.

Similar to the antenna assembly 400, for example, the antenna assembly 500 may include the tool mandrel 304 and the reduced-diameter saddle 406 may extend along a portion of the outer surface 404 thereof. The outer sleeve 408 may extend across the saddle 406 to encapsulate and otherwise house the various components of the antenna assembly 500 within the saddle 406. The antenna assembly 500 may further include the bobbin 306, and the coil 308 may be wrapped about the outer bobbin surface 418b and extend (i.e., wind) axially along at least a portion thereof. In the illustrated embodiment, the outer bobbin surface 418b provides the winding grooves 420 that receive and seat the coil 308, but the winding grooves 420 could alternatively be omitted from the embodiment. The protective layer 422 may also be formed about the bobbin 306 within the saddle 406, as generally described above.

Unlike the antenna assembly 400 of FIG. 4, however, the antenna assembly 500 may include an inner sleeve 502 that receives the ferrites 414 and interposes the bobbin 306 and the tool mandrel 304. The inner sleeve 502 may be made out of any non-magnetic, electrically insulating, and/or non-conductive material including, but not limited to a non-magnetic metal (e.g., 718 INCONEL®, beryllium copper alloy, such as TOUGHMET®, etc.), a high temperature plastic, a thermoplastic, a polymer (e.g., a polyimide), a ceramic, an epoxy material, a composite material (e.g., fiberglass), or any combination thereof. The inner sleeve 502 can be fabricated, for example, by additive manufacturing (i.e., 3D printing), molding, injection molding, machining, forming, or other known manufacturing processes. The inner sleeve 502 may prove advantageous in enhancing the mechanical strength of the antenna assembly 500.

The inner sleeve 502 may provide an inner sleeve surface 504a and an outer sleeve surface 504b. The outer sleeve surface 504b may be positioned radially inward from the inner bobbin surface 418a of the bobbin 306. In at least one embodiment, the outer sleeve surface 504b may physically engage the inner bobbin surface 418a, but it is not required. Moreover, as illustrated, a plurality of ferrite channels 506 may be defined on the inner sleeve surface 504a of the inner sleeve 502. The ferrite channels 506 may be configured to receive and seat the ferrites 414, which, as discussed above, radially interpose the coil 308 and the underlying tool mandrel 304 to shield the coil 308 from eddy currents generated by the tool mandrel 304.

Figure 5B:
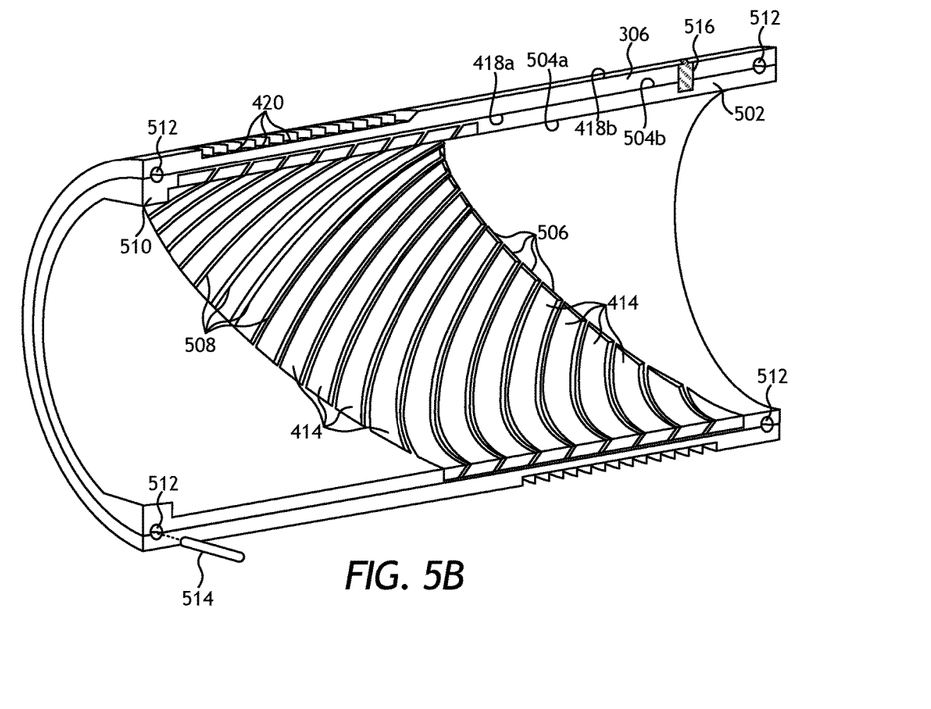
FIG. 5B is an isometric view of a portion of the antenna assembly of FIG. 5A.

FIG. 5B depicts an isometric view of a portion of the antenna assembly 500. In some embodiments, the ferrite channels 506 may be defined in the inner sleeve 502 such that they extend generally orthogonal to the winding grooves 420 defined in the outer bobbin surface 418b; i.e., at an angle rotated 90° from the angle 312 (FIG. 3A) offset from the central axis 310 (FIG. 3A). Accordingly, the ferrites 414 may be characterized as "tilted" ferrites, as they are required to be tilted about the curvature of the inner sleeve 502. In some embodiments, each ferrite channel 506 may be configured to receive a single ferrite 414. In other embodiments, however, each ferrite channel 506 may be configured to receive two or more ferrites 414 arranged end-to-end.

In some embodiments, as illustrated, each ferrite channel 506 may be formed and otherwise separated by a ridge or divider 508 defined on the inner sleeve surface 504a and extending radially inward. When the ferrites 414 are received within the ferrite channels 506, the dividers 508 may serve to prevent physical contact between laterally adjacent ferrites 414, and thereby prevent a continuous magnetic path between the laterally adjacent ferrites 414. As part of the inner sleeve 502, the dividers 508 may also be made of a non-magnetic material, which exhibits a relative permeability ($\mu_r$) of approximately 1. Accordingly, the dividers 508 may be considered substantially equivalent to providing air gaps between the adjacent ferrites 414, and thereby serving as non-magnetic insulators between the adjacent ferrites 414.

One or more alignment protrusions 510 may be provided on the inner sleeve surface 504a and otherwise extend radially inward from the inner sleeve 502. The alignment protrusion 510 may be configured to mate with an alignment groove or notch (not shown) defined in the outer surface 404 of the tool mandrel 304. By mating the alignment protrusion 510 with the alignment notch, the antenna assembly 500 may be able to be aligned axially and/or rotationally with axially adjacent (i.e., uphole or downhole) wellbore logging tools in a downhole assembly.

Moreover, one or more holes 512 may be cooperatively defined between the bobbin 306 and the inner sleeve 502 and used to couple the two components. FIG. 5B depicts one-half of the combination of the bobbin 306 and the inner sleeve 502. Alignment pins 514 (one shown) may be inserted into the holes 512 to help axially align the other half of the combination of the bobbin 306 and the inner sleeve 502. The alignment pins 514 may also prove useful in preventing relative rotation between the bobbin 306 and the inner sleeve 502 during operation.

Moreover, in some embodiments, the bobbin 306 and the inner sleeve 502 may be coupled using one or more anti-rotation devices 516 that radially extend at least partially through each of the bobbin 306 and the inner sleeve 502. As will be appreciated, the anti-rotation device(s) 516 may prove advantageous in angularly aligning the bobbin 306 with the inner sleeve 502 for desired operation. In other embodiments, however, the anti-rotation device(s) 516 may alternatively comprise a keyway or a similar mechanism that prevents relative axial and rotational movement between the bobbin 306 and the inner sleeve 502, without departing from the scope of the disclosure.

The antenna assembly 500 may be manufactured and otherwise built by first placing the ferrites 414 within the ferrite channels 506 and then positioning the inner sleeve 502 about the tool mandrel 304 (e.g., within the saddle 406). In some embodiments, the bobbin 306 may be subsequently molded directly onto the outer sleeve surface 504b. In other embodiments, the bobbin 306 may be subsequently printed directly onto the outer sleeve surface 504b via any of the additive manufacturing processes mentioned herein. In such embodiments, the bobbin 306 may be printed by rotating the tool mandrel 304 about the central axis 310 (FIG. 5A) while progressively building the bobbin 306 with a 3D printing machine (not shown) to desired dimensions. Alternatively, the 3D printing machine may be configured to move about the central axis 310 to progressively build up bobbin 306 to desired dimensions. In yet other embodiments, a combination of rotating the tool mandrel 304 and the 3D printing machine about the central axis 310 may be employed to progressively build up the bobbin 306 to desired dimensions.

Placing the ferrites 414 in the inner sleeve 502 and positioning the bobbin 306 about the inner sleeve 502 may prove advantageous in providing flexibility in changing the ferrite 414 design without requiring a commensurate design change for the bobbin 306. Thus, the bobbin 306 and the inner sleeve 502 may comprise interchangeable components of the antenna assembly 500. In such embodiments, a universal design for the bobbin 306 may be employed while the design of the inner sleeve 502 may be altered to fit varying logging needs and to otherwise conform to varying ferrite 414 designs. As a result, the design or configuration of the coil 308 may be maintained, while the ferrites 414 may be adjusted to meet particular logging needs. This may advantageously ease the assembly process for the antenna assembly 500.

Embodiments disclosed herein include:

A. Antenna assembly that includes a bobbin positionable about an outer surface of a tool mandrel and providing an outer bobbin surface, a coil wrapped about and extending longitudinally along at least a portion of the outer bobbin surface, and an inner sleeve that interposes the bobbin and the tool mandrel and receives a plurality of ferrites that interpose the tool mandrel and the coil.

B. A method of manufacturing an antenna assembly that includes positioning an inner sleeve about an outer surface of a tool mandrel, the inner sleeve having a plurality of ferrites arranged within a corresponding plurality of ferrite channels defined on an inner sleeve surface of the inner sleeve, positioning a bobbin about the tool mandrel with the inner sleeve interposing the bobbin and the tool mandrel, and wrapping a coil about an outer bobbin surface of the bobbin such that the plurality of ferrites interposes the tool mandrel and the coil.

C. A method that includes introducing a wellbore logging tool into a wellbore, the wellbore logging tool including a tool mandrel, a bobbin positioned about an outer surface of the tool mandrel and providing an outer bobbin surface, a coil wrapped about the outer bobbin surface, and a plurality of ferrites coupled to an inner sleeve that interposes the bobbin and the tool mandrel, wherein the plurality of ferrites interpose the tool mandrel and the coil, and obtaining measurements of a surrounding subterranean formation with the wellbore logging tool.

Each of embodiments A, B, and C may have one or more of the following additional elements in any combination: Element 1: wherein the plurality of ferrites are seated within a plurality of ferrite channels defined on an inner sleeve surface of the inner sleeve. Element 2: wherein the plurality of ferrite channels are defined by one or more dividers positioned between laterally adjacent ferrites of the plurality of ferrites. Element 3: wherein the bobbin defines one or more winding grooves on the outer bobbin surface and the coil is received within the one or more winding grooves, and wherein the plurality of ferrite channels extend generally orthogonal to the one or more winding grooves. Element 4: wherein the inner sleeve comprises a material selected from the group consisting of a non-magnetic metal, a plastic, a thermoplastic, a polymer, a ceramic, an epoxy material, a composite material, and any combination thereof. Element 5: wherein the inner sleeve is printed via additive manufacturing. Element 6: further comprising one or more anti-rotation devices that couple the bobbin and the inner sleeve. Element 7: wherein tool mandrel defines a reduced-diameter saddle, the antenna assembly further comprising a protective layer formed about the bobbin and the coil within the saddle, and an outer sleeve that extends axially across the saddle to encapsulate the bobbin and the protective layer. Element 8: wherein the coil is wound about the outer bobbin surface at an angle offset from a central axis of the tool mandrel.

Element 9: further comprising printing the plurality of ferrites via an additive manufacturing process, and securing the plurality of ferrites within the plurality of ferrite channels using at least one of an adhesive or one or more mechanical fasteners. Element 10: further comprising separating laterally adjacent ferrites of the plurality of ferrites with one or more dividers defined in the inner sleeve surface. Element 11: wherein positioning the bobbin about the tool mandrel comprises molding the bobbin onto an outer sleeve surface of the inner sleeve. Element 12: wherein positioning the bobbin about the tool mandrel comprises printing the bobbin onto an outer sleeve surface of the inner sleeve via an additive manufacturing process. Element 13: further comprising coupling the bobbin and the inner sleeve with one or more anti-rotation devices. Element 14: wherein the inner sleeve and the bobbin are arranged in a reduced-diameter saddle defined in the outer surface of the tool mandrel, the method further comprising positioning a protective layer about the bobbin and the inner sleeve within the saddle, and encapsulating the inner sleeve, the bobbin, and the protective layer within the saddle with an outer sleeve that extends axially across the saddle. Element 15: further comprising winding the coil about the outer bobbin surface at an angle offset from a central axis of the tool mandrel.

Element 16: wherein the tool mandrel is operatively coupled to a drill string and introducing the wellbore logging tool into the wellbore further comprises extending the wellbore logging tool into the wellbore on the drill string, and drilling a portion of the wellbore with a drill bit secured to a distal end of the drill string. Element 17: wherein introducing the wellbore logging tool into the wellbore further comprises extending the wellbore logging tool into the wellbore on wireline as part of a wireline instrument sonde.

By way of non-limiting example, exemplary combinations applicable to A, B, and C include: Element 1 with Element 2; and Element 1 with Element 3.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
   a coil wrapped about an outer surface of a bobbin positioned within a saddle of a tool mandrel;
   an inner sleeve positioned on an outer surface of the tool mandrel within the saddle, the inner sleeve being interposed between the coil and the tool mandrel;
   a plurality of ferrite channels defined on an inner surface of the inner sleeve, the plurality of ferrite channels being laterally separated by a plurality of dividers defined on the inner sleeve; and
   a plurality of ferrites disposed individually within respective ones of the plurality of ferrite channels,
   wherein the outer surface of the bobbin defines a plurality of winding grooves configured to receive and seat a plurality of windings of the coil, and wherein the plurality of ferrite channels extend orthogonal to the plurality of winding grooves.

2. The antenna assembly of claim 1, wherein an outer surface of the inner sleeve is in physical contact with an inner surface of the bobbin, and wherein the inner surface of the inner sleeve is in physical contact with the outer surface of the tool mandrel within the saddle.

3. The antenna assembly of claim 1, wherein the plurality of ferrites extend radially outward from the groove and are in physical contact with the outer surface of the tool mandrel within the saddle.

4. The antenna assembly of claim 1, wherein the plurality of ferrites extend circumferentially about the outer surface of the tool mandrel within the plurality of ferrite channels.

5. The antenna assembly of claim 1, wherein the bobbin is coupled to the inner sleeve via one or more anti-rotation devices.

6. The antenna assembly of claim 1, wherein each winding of the plurality of windings is received by respective ones of the plurality of winding grooves.

7. The antenna assembly of claim 1, further comprising:
   an outer sleeve positioned about at least a portion of the outer surface of the tool mandrel, wherein an inner diameter of the outer sleeve is greater than an outer diameter of the saddle such that the outer sleeve circumferentially encapsulates the saddle, wherein the plurality of winding grooves are interposed between the plurality of ferrites and the outer sleeve.

8. The antenna assembly of claim 1, wherein the plurality of ferrite channels are arranged at a first angle that is orthogonal to a second angle that is offset from a central axis of the tool mandrel, and wherein the plurality of ferrite channels are tilted about a curvature of the inner sleeve based on the first angle.

9. The antenna assembly of claim 1, wherein the inner sleeve comprises one or more protrusions that extend radially inward from the inner sleeve.

10. The antenna assembly of claim 1, wherein the inner sleeve is coupled to the bobbin using one or more holes cooperatively defined between the bobbin and the inner sleeve, and further comprising one or more alignment pins insertable into the one or more holes to axially align the inner sleeve relative to the bobbin.

11. The antenna assembly of claim 1, further comprising:
    a protective layer positioned on at least a portion of the outer surface of the tool mandrel and the outer surface of the bobbin within the saddle, the protective layer being in physical contact with at least a portion of the inner sleeve.

12. A method of assembling an antenna assembly, comprising:
    wrapping a coil about an outer surface of a bobbin positioned within a saddle of a tool mandrel;
    positioning an inner sleeve on an outer surface of the tool mandrel within the saddle, the inner sleeve being interposed between the coil and the tool mandrel;
    arranging a plurality of ferrite channels on an inner surface of the inner sleeve, the plurality of ferrite channels being laterally separated by a plurality of dividers defined on the inner sleeve; and
    disposing a plurality of ferrites individually within respective ones of the plurality of ferrite channels,
    wherein the outer surface of the bobbin defines a plurality of winding grooves configured to receive and seat a plurality of windings of the coil, and wherein the plurality of ferrite channels extend orthogonal to the plurality of winding grooves.

13. The method of claim 12, wherein the plurality of ferrite channels are arranged at a first angle that is orthogonal to a second angle that is offset from a central axis of the tool mandrel, and wherein the plurality of ferrite channels are tilted about a curvature of the inner sleeve based on the first angle.

14. A method, comprising:
    introducing a wellbore logging tool into a wellbore, the wellbore logging tool including a coil wrapped about an outer surface of a bobbin positioned within a saddle of a tool mandrel, an inner sleeve positioned on an outer surface of the tool mandrel within the saddle, the inner sleeve being interposed between the coil and the tool mandrel, a plurality of ferrite channels defined on an inner surface of the inner sleeve, wherein the plurality of ferrite channels are laterally separated by a plurality of dividers defined on the inner sleeve, and a plurality of ferrites disposed individually within respective ones of the plurality of ferrite channels, wherein the outer surface of the bobbin defines a plurality of winding grooves configured to receive and seat a plurality of windings of the coil, and wherein the plurality of ferrite channels extend orthogonal to the plurality of winding grooves; and obtaining measurements of a surrounding subterranean formation with the wellbore logging tool.

* * * * *